United States Patent
Reith et al.

(10) Patent No.: US 8,078,369 B2
(45) Date of Patent: Dec. 13, 2011

(54) METHOD AND DEVICE FOR CONTROLLING A STANDSTILL CIRCUIT OF AN AUTOMATIC TRANSMISSION

(75) Inventors: Ulrich Reith, Schlier (DE); Wolfgang Groener, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 699 days.

(21) Appl. No.: 11/913,813

(22) PCT Filed: Apr. 20, 2006

(86) PCT No.: PCT/EP2006/003638
§ 371 (c)(1),
(2), (4) Date: Nov. 7, 2007

(87) PCT Pub. No.: WO2006/119851
PCT Pub. Date: Nov. 16, 2006

(65) Prior Publication Data
US 2008/0221762 A1    Sep. 11, 2008

(30) Foreign Application Priority Data
May 11, 2005  (DE) .......................... 10 2005 021 720

(51) Int. Cl.
*B60K 17/08*    (2006.01)

(52) U.S. Cl. .............................. 701/51; 701/61; 477/93

(58) Field of Classification Search ............... 701/51, 701/58, 61, 70; 477/93, 114
See application file for complete search history.

(56) References Cited

U.S. PATENT DOCUMENTS

| | | | | |
|---|---|---|---|---|
| 4,644,826 | A * | 2/1987 | Kubo et al. | 477/95 |
| 4,717,207 | A * | 1/1988 | Kubota et al. | 303/3 |
| 5,033,002 | A * | 7/1991 | Sol | 701/90 |
| 5,662,548 | A | 9/1997 | Mori | |
| 5,916,062 | A * | 6/1999 | Siepker | 477/194 |
| 5,925,087 | A * | 7/1999 | Ohnishi et al. | 701/70 |
| 6,059,681 | A | 5/2000 | Takiguchi | |
| 6,188,946 | B1 * | 2/2001 | Suzuki et al. | 701/62 |
| 7,734,403 | B2 * | 6/2010 | Baijens et al. | 701/70 |
| 2005/0075775 | A1 * | 4/2005 | Carlson et al. | 701/51 |
| 2008/0294319 | A1 * | 11/2008 | Baijens et al. | 701/70 |

FOREIGN PATENT DOCUMENTS

| | | |
|---|---|---|
| DE | 196 19 717 A1 | 11/1996 |
| DE | 199 02 131 A1 | 8/1999 |
| DE | 100 32 951 A1 | 1/2002 |
| DE | 101 54 792 A1 | 9/2002 |
| DE | 102 08 206 A1 | 9/2002 |
| DE | 103 08 699 A1 | 10/2003 |

(Continued)

*Primary Examiner* — Helal A Algahaim
(74) *Attorney, Agent, or Firm* — Davis & Bujold, P.L.L.C.

(57) ABSTRACT

The invention relates to a method and a device for controlling a standstill circuit of an automatic transmission of the vehicle, comprising a decision unit for selection of the target gear, a low-speed monitoring unit and a standstill circuit, which, when the vehicle is standing still or when its speed falls below a predetermined limit speed, brings about or prepares the activation of a starting gear.

The method and the device are intended to enable a vehicle to start up safely even under the influence of considerable tractive resistance. Furthermore, they should be characterized by solutions which are as simple, inexpensive and easy to implement as possible by way of available methods and devices. To this end, the low-speed monitoring unit reads data concerning at least one state of the vehicle and, if necessary, additional data, and, on the basis thereof, as a function of decision rules, renders the standstill circuit ineffective.

1 Claim, 1 Drawing Sheet

FOREIGN PATENT DOCUMENTS

| | | |
|---|---|---|
| JP | 60-081558 | 5/1985 |
| JP | 03-096760 | 4/1991 |
| JP | 08-326910 | 12/1996 |
| JP | 11-193866 | 7/1999 |

* cited by examiner

METHOD AND DEVICE FOR CONTROLLING A STANDSTILL CIRCUIT OF AN AUTOMATIC TRANSMISSION

This application is a national stage completion of PCT/EP2006/003638 filed Apr. 20, 2006, which claims priority from German Application Serial No. 10 2005 021 720.6 filed May 11, 2005.

FIELD OF THE INVENTION

The invention relates to a method and a device for controlling a standstill circuit of an automatic transmission.

BACKGROUND OF THE INVENTION

Automatic transmissions have been in use in a variety of vehicle types for some time. They are characterized by a mechanical uncoupling of the gear selection elements and the gear selection in the transmission and enable the driver of the motor vehicle to fulfill his task more easily by either completely automatically selecting and activating a suitable gear or at least checking the driver's gear selection for plausibility and rejecting or modifying it if necessary.

To this end, a decision unit is necessary. The decision unit, with the help of data supplied to it, such as the speed of the vehicle, the input rotational speed of the transmission, motor control data and/or additional data, either selects the gear to be activated or evaluates the gear selection manually entered by the driver and, if and as necessary, modifies it, rejects it or accepts it unchanged as the new gear.

In addition, automatic transmissions are provided with a suitable control device for controlling the automatic transmission, where the control device controls and/or governs the implementation of the actual shifting operation. This device, together with the decision unit, may constitute a single unit. Alternatively, it may take the form of a separate module. Among other things, it may have the ability to exercise a retroactive effect on the decision unit when the target gear cannot be activated.

In applications of this type, the decision unit generally includes a standstill circuit which, when the vehicle is standing still or when its speed falls below a predetermined limit speed, brings about or prepares the activation of a starting gear, which is generally the lowest forward gear. This is advantageous in a normal vehicle operation, however under certain circumstances it may result in an overall undesirable behavior of the automatic transmission.

When a vehicle starts moving under the influence of considerable tractive resistance, for example on a steep slope, under very heavy load, on loose soil or into an extreme headwind in combination with a box body, it happens that after the vehicle has started up and while the automatic transmission is shifting into a higher gear selected by the decision unit or by the driver, the vehicle slows down considerably as soon as the traction force of the drive motor is no longer available to the wheels. The only exceptions to this situation are certain special types of transmissions designed for shifting gears under load.

As a result of the interruption of traction force occasioned by the shifting operation and the concomitant reduction of the vehicle speed, a standstill circuit in the decision unit is activated when, for example, the vehicle speed falls below the predetermined limit speed or is reduced to zero or even to a negative value.

The target gear originally selected by the decision unit, generally the second gear, is then replaced by a gear predetermined by the standstill circuit, most frequently the first gear. This, in turn, leads to an interruption of the original shifting process and an activation of the new target gear or, insofar as the shifting process had already been activated when the standstill circuit was selected, an immediate shift back into the new target gear. Accordingly, as long as the boundary conditions remain unchanged, it will not be possible to shift into the second gear, because the standstill circuit will be reactivated again and again as soon as a shifting operation into a higher gear is initiated or performed.

Various solutions for this problem are conceivable. Each such solution, however, is burdened with specific disadvantages.

Power shift transmissions of the type mentioned above enable the gears to be shifted without interrupting the traction force. As a general rule, however, they are significantly more expensive than other transmissions. Furthermore, they often significantly impose more stringent requirements with regard to the installation space necessary.

A driver in the situation described above might be able, without changes in the transmission or the transmission control, to use the starting gear until a higher vehicle speed is attained, in order to prevent the vehicle from losing speed during the shifting process, to the point of falling below the limit speed and triggering the standstill circuit. The problem with such an action is that, precisely in the case of an automatic transmission, the driver can actually exert, at best, only an indirect influence on the gear selection, for example, by pressing down hard on the gas pedal in order to induce a higher engine rotational speed, thereby delaying the triggering of the shifting process by the decision unit. If the vehicle is starting up on loose ground, such as deep sand or on gravel, snow or ice, in combination with an incline, this can give rise to a significant risk of wheel spin.

This is unacceptable, not only for reasons of safety, but because it causes a sharp increase in the rotational speed of the wheels, while only slightly increasing the vehicle speed. Because most vehicle systems, however, do not utilize the true speed of the vehicle on the ground, but rather calculate the vehicle speed on the basis of a value derived from the rotational speed of the wheels, wheel spin of the driven wheels leads to the triggering of the shifting process, which was, in fact, intended to be delayed by this action until the vehicle achieved a higher speed.

If the vehicle is equipped with a manual gear selection device, the driver can attempt to start in the second gear and thereby avoid the problem described above, at the price of increased wear on the clutch. In any event, though, conventional standstill circuits are made in such a way as to correct such a gear selection by the driver automatically, meaning that this action as well will not be productive Alternatively, the driver could attempt through the use of shifting elements in the nature of a manually sequentially shiftable shifting device of the automatic transmission or by limiting the shiftable gears by way of a transmission selector lever—to put off shifting gears until the vehicle has achieved a higher speed. This action could be helpful in certain borderline cases, however, such action assumes conscious intervention on the part of the driver and reaches its limits at the latest when the decision unit, on the basis of the data available to it, automatically triggers a shifting process. For this reason, it is not applicable to automatic transmissions which do not comprise elements for the manual selection of a target gear.

In view of that set forth above, it may be stated, as a general rule, that a standstill circuit, though basically expedient in normal vehicle operation, can considerably impede the operation of a vehicle under certain boundary conditions, by preventing, or at least impeding, a shift into a higher gear as the vehicle starts up.

Against the background set forth above, the object of the present invention is to propose a method for controlling a standstill circuit of an automatic transmission, by way of which the disadvantages described above may be avoided.

The object is to especially enable a vehicle to start up safely even under the influence of considerable tractive resistance. Furthermore, the object of the invention is to propose a device such that the method can be implemented. Moreover, both the method and the device should be characterized by a solution of the task which is as simple, inexpensive and easy to implement as possible.

SUMMARY OF THE INVENTION

The invention is based on recognition of the fact that the problems described above, in connection with the starting of a vehicle under considerable tractive resistance and in the case of an automatic transmission equipped with a decision unit and a standstill circuit, can be avoided if the standstill circuit is rendered ineffective under certain conditions. To this end, it is advantageous to provide a low-speed monitoring unit which renders the standstill circuit ineffective when certain conditions are present.

The invention accordingly originates with a method for controlling a standstill circuit in an automatic transmission of a vehicle, which is equipped with a decision unit for selecting the target gear, a low-speed monitoring unit and a standstill circuit which, when the vehicle is standing still or when its speed falls below a predetermined limit speed, brings about or prepares the activation of a starting gear.

The concept of control should, therefore, be understood to include, in addition to pure control, a set of rules which take into account the state of the standstill circuit at any given moment or the states thereof within a limited period of time in the past.

The automatic transmission, the decision unit, the standstill circuit and the low-speed monitoring unit can be constructionally and/or functionally integrated with each other and/or with additional elements of a control device for control of the automatic transmission or can also be configured as separate modules or can be integrated with other and/or additional modules. The important aspect of these embodiments is function alone and not the design implementation, arrangement or technical means of implementing the shifting process. Accordingly, in the simplest case, the low-speed monitoring unit may comprise a mechanical switch to be activated by the driver, where the switch can interrupt the transmission of a signal from a standstill circuit to a decision unit. In many cases, however, a design implementation in the form of a hardwired circuit and/or a software-controlled circuit is expedient or necessary.

In addition, with regard to the method used to solve the task set, it is provided that the low-speed monitoring unit reads in data at least regarding the state of a vehicle and possibly additional data and that, on the basis thereof and as a function of decision rules, it renders the standstill circuit ineffective.

In conceptual terms, we shall assume hereinafter that the standstill circuit is basically effective throughout the use of the vehicle and that it is temporarily de-activated by the low-speed monitoring unit, when necessary. Naturally, solutions founded on a standstill circuit which is basically ineffective, and which is temporarily activated by the low-speed monitoring unit when necessary, constitute technically equivalent solutions, which are also covered by the scope of protection claimed.

The selection of the basic state assumed, as set forth above, will depend on existing components and/or existing control software modules available in individual cases.

BRIEF DESCRIPTION OF DRAWINGS

The invention will now be described, by way of example, with reference to the accompanying drawings in which.

DETAILED DESCRIPTION OF THE INVENTION

Figure 1:
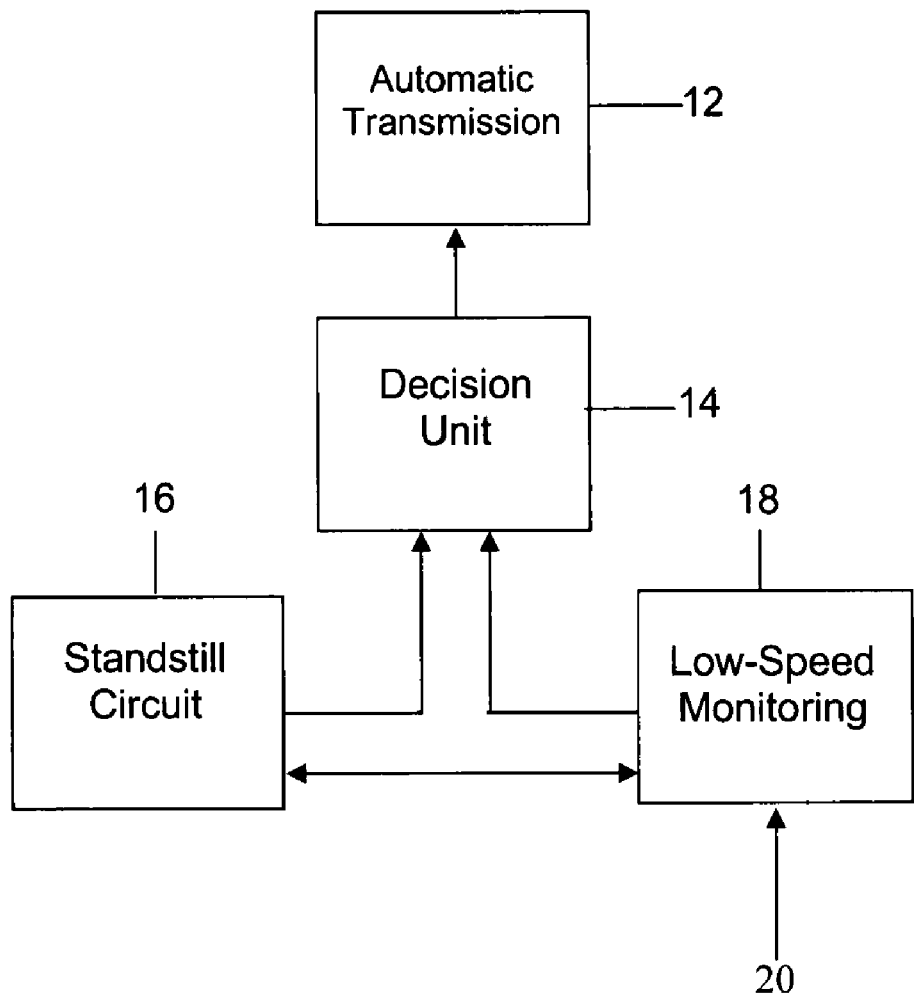
FIG. 1 is a diagrammatic representation of a power shift transmission of the present invention.

As illustrated in FIG. 1, a power shift transmission 10 of the present invention includes an automatic transmission 12, a decision unit 14 controling operation of the automatic transmission 12, including selecting a transmission gear ratio, and a standstill circuit 16 and a low-speed monitoring unit 18 controlling operation of the decision unit 14.

A first preferred embodiment of the invention provides for the low-speed monitoring unit 18 to read data 20 that is based on a direct influence of the driver and, on the basis thereof and as a function of decision rules, to render the standstill circuit 16 ineffective. Direct influence of the driver refers to an action which is actively performed by the driver. This has the advantage that the driver, by contrast to other embodiments, can exert a direct influence on the effectiveness or ineffectiveness of the standstill circuit 16. This direct influence not only enables, in an especially simple way, consideration of the driver's personal capabilities and/or individual preferences with regard to the startup behavior of the vehicle; it can also make a significant contribution to the acceptance of the innovative method.

A number of especially advantageous embodiments are explained in greater detail below. Prior to that explanation, however, we shall first state that the signals relevant to many of these embodiments may be based not only on the direct influence of the driver, but rather may also be issued by other components and/or modules.

A first embodiment provides for the low-speed monitoring unit 18 to read data 20 concerning the deflection of a gas pedal and to render the standstill circuit 16 ineffective when the gas pedal angle has exceeded a first limit value. In this way, by deflecting the gas pedal, the driver can exert direct influence on the effectiveness of the standstill circuit 16. On the other hand, the driver does not require any specific previous knowledge of the effects and/or operation of the low-speed monitoring unit 18 because, in at least a majority of the cases described above, in which it is advisable to disable the low-speed monitoring unit 18, a relatively large deflection of the gas pedal is required in order to set the vehicle in motion at all.

However, should any given actual deflection be converted—for example, by way of a engine control or control by an electronic gas pedal—into a virtual or corrected deflection which, for example, has the effect that a certain gas pedal deflection angle will always correspond to a defined acceleration of the vehicle, irrespective of load, slope, soil properties or any other factors, it will obviously be expedient to select this virtual or corrected deflection as the reference limit. In such a case, the input value used is, admittedly, only indirectly based on influence by the driver; nonetheless, ultimately it fulfills the same function.

A second embodiment provides for the low-speed monitoring unit 18 to read data 20 concerning the activation of a vehicle brake, and to render the standstill circuit 16 ineffective when the vehicle brake produces no braking effect or when the braking effect is below a second limit value.

In this way, the monitoring of the standstill circuit 16 is only triggered when the driver, or another system, brakes. If the reduction in the vehicle speed to below a limit value, at which the standstill circuit 16 is activated, is dependent upon direct actuation of the brake by the driver or on another system, it may be assumed, in most cases, that it will not be necessary to render the standstill circuit 16 ineffective.

In the simplest case, it is possible to use the brake light switch in order to determine whether the driver has activated the brake. In newer vehicles, however, data 20 with regard to brake activation are also available from the brake control device and also, in many cases, from a CAN bus internal to the vehicle, which is to say a vehicle data transmission system.

However, in cases where the brake is activated only slightly, this may be due to the automatic activation of the brake by an anti-slip device when a wheel begins to slip. Accordingly, it is expedient to take into consideration the value and/or the type of brake activation in deciding whether or not to render the standstill circuit 16 ineffective.

If the low-speed monitoring unit 18, according to an additional embodiment, reads data 20 concerning a requirement for the standstill circuit 16 and then renders the standstill circuit 16 ineffective when there is no requirement for the standstill circuit 16, the driver, subject to the existence of a sensor—for example, a switch—intended for direct actuation by the driver, can decide directly on the activation or de-activation of the standstill circuit 16, irrespective of any additional parameters.

A somewhat different implementation of the invention provides for the low-speed monitoring unit 18 to read data 20 concerning de-activation of the standstill circuit 16 and then to render the standstill circuit 16 ineffective when the standstill circuit 16 has been de-activated. The difference between the two embodiments basically lies in the fact that, in the first case, active actuation of a switch is presumed in order to activate the standstill circuit 16 whereas, in the second case, the active actuation of a switch is provided to de-activate it.

The switching element comprises a switch with two or more maintained-contact switch positions, such that there is no practical difference between the two embodiments. However, should a sensor be used—as is preferable, in many cases, for ergonomic reasons—in order to exert a temporary effect on the standstill control, the question of whether the basic state of the system provides for activation or de-activation of the standstill circuit 16 is likely to play an important role. The same applies to systems which revert to a defined basic state when the vehicle ignition is turned off.

Naturally, when necessary and in special cases, the activation and/or de-activation can be influenced and/or overwritten by other signals. Precisely for this purpose, it is expedient and desirable to combine embodiments set forth in this document by way of hierarchical linkage and/or according to the rules of Boolean algebra. For example, a switching element, by which the standstill circuit 16 is basically activated, may be provided for the driver. In addition, however, the actual activation of the standstill circuit 16 may be made contingent upon other requirements described above or below.

Furthermore, when necessary, a switch—for example, a four-stage switch—may be provided for operation by the driver. In addition to the "activate standstill circuit" and "de-activate standstill circuit" positions, this switch has two subordinate positions enabling the driver to take additional factors of influence into account or to implement a forced activation or de-activation. Naturally, it is also possible for an automatic system to set the switch position instead of the driver and/or to emit a corresponding signal.

Although, in the preceding paragraphs, the focus of the description was on data 20 which are or at least could be based on direct influence by the driver, the embodiments of the method, which appear below, are based on a configuration whereby the low-speed monitoring unit 18 reads data 20 which can be directly acquired from the transmission and/or the clutch and which relate to the state of the transmission and/or the clutch and, on the basis of the aforesaid data 20, as a function of decision rules, renders the standstill circuit 16 ineffective. This not only offers the advantage of releasing the driver from having to exert active influence and obviating the manual entry of parameters, which might prove disadvantageous, but also offers advantages insofar as the data 20 required for the embodiments of the method which are described in more precise detail below are already present, in nearly all cases, in the transmission control unit and/or its subunits: the decision unit 14, the control device and/or the standstill circuit 16.

Insofar as, within the transmission control, data 20 are present which concern the direction of rotation of a transmission shaft, it is advantageous for the low-speed monitoring unit 18 to read these data 20 from a rotation direction detector, and then to render the standstill circuit 16 ineffective when it recognizes the direction of rotation. As a result, the standstill circuit 16 is activated when the vehicle is at a standstill; on the other hand, at even a slight remaining travel speed, a direction of rotation will always be recognized and the standstill circuit 16 will be de-activated.

Another embodiment of the method provides for the low-speed monitoring unit 18 to read data 20 concerning a direction of rotation from a rotation direction detector and then to render the standstill circuit 16 ineffective when it recognizes a reversal in the direction of rotation. A reversal in the direction of rotation is a reliable index for a starting process in which the vehicle—for example, as the result of a steep slope—not only comes to a halt in the course of a shifting process, but even rolls backward. Accordingly, the reversal in the direction of rotation is quite suitable as an indicator that de-activation of the standstill circuit 16 is expedient. On the other hand, in order to exclude activation when the vehicle rolls back a few centimeters—for example, when stopping at a traffic light or the like—it is especially recommended, in this case, to provide speed limit values and/or to consult additional data 20.

The low-speed monitoring unit 18—for example, with the help of a speed sensor or a rotation direction detector—can also read data 20 concerning a standstill of the vehicle and can then render the standstill circuit 16 ineffective when it does not recognize a standstill of the vehicle within a defined interval of time. This has the advantage that, whenever the vehicle is at a standstill for a relatively long time—for example, at least 2 seconds—the standstill circuit 16 is activated. On the other hand, in the majority of cases where the vehicle starts up against considerable tractive resistance and where the vehicle speed drops to zero in the course of the shifting process, only very brief standstill times will be observed before the vehicle either again accelerates in the original direction or rolls back. In either case, the standstill circuit 16 will be switched off.

Intervention by a standstill circuit 16 in a shifting process which has already been initiated can be especially simply and effectively suppressed when the low-speed monitoring unit 18 reads data 20 concerning a shifting state of the transmission and then renders the standstill circuit 16 ineffective when it recognizes that shifting is in progress, especially when a change of gears is in the course of taking place. This embodiment of the method requires only a minimal extra expense to install in an existing conventional transmission control program and reliably prevents the interruption of a gear change which has already begun.

When the low-speed monitoring unit 18 reads data 20 concerning a shifting state of the transmission and then renders the standstill circuit 16 ineffective when it recognizes that a change of gears took place within a defined interval of time, the standstill circuit 16 will also be rendered ineffective for a defined period of time after the shifting process is complete. This has the effect of preventing immediate downshifting following the successful implementation of a shifting process. Instead of or in addition to a time-related criterion, it is also possible to apply parameters such as vehicle speed, the input rotational speed of the transmission or other parameters.

An especially simple embodiment of the invention is achieved when the low-speed monitoring unit 18 reads data 20 concerning the disengaged state of the clutch and then renders the standstill circuit 16 ineffective when it recognizes that the clutch is disengaged. A disengaged clutch in the torque transmission path, between the drive motor and the vehicle wheels, can signal that shifting of the gears is presently taking place.

In a case of an automatically activated clutch, because a signal concerning the state of the clutch is always present, this signal can also be used for an especially simple embodiment of the method. In this regard, as in the case of signals read in other embodiments, it is irrelevant whether the signal describes an actual state or is generated as a default value in the control process. In the actual case, a signal from a clutch position sensor—insofar as such a sensor is present —can be used. If such a signal is not available, however, a control signal sent to an actuator which actuates the clutch can also be analyzed and used.

On the other hand, cases are also conceivable in which it would be expedient for the low-speed monitoring unit 18 to read data 20 concerning the disengaged state of the clutch and then to render the standstill circuit 16 ineffective when it recognizes that the clutch is engaged. In this way, it would be possible, following a successfully implemented shifting process, to prevent the standstill circuit 16 from being activated as soon as the clutch has engaged again.

By contrast to the forms of the method described above, other embodiments of the method will now be described below, in which the low-speed monitoring unit 18 reads data 20 which can be directly acquired from the drive motor or motor control device and which relate to the state of the drive motor and, on the basis of the aforesaid data 20, as a function of decision rules, renders the standstill circuit 16 ineffective.

These embodiments, by contrast to those described up to this point, tend to offer the advantage of being able to take into account the efficiency of the motor in deciding to de-activate the standstill circuit 16. Accordingly, for example, when the slope of the ground is too great and the torque of the drive motor does not suffice to set the vehicle in motion against the slope, the de-activation of a standstill circuit 16 can be canceled by the low-speed monitoring unit 18. This automatically brings about a new attempt to start the vehicle in the starting gear. The data 20 used can obviously also be obtained from other control devices or estimated or calculated on the basis of data 20 from other control devices. The decisive element is simply that the data 20 in these embodiments relate to a state of the drive motor and that these data 20, in many cases, are anyway available from a motor control device or can be generated or estimated on the basis of the data 20 available there with minimal effort.

Thus, the first embodiment of the method provides for the low-speed monitoring unit 18 to read data 20 concerning the rotational speed of the motor and then to render the standstill circuit 16 ineffective when it recognizes that the rotational speed of the motor has exceeded a third limit value. In this way, the standstill circuit 16 can be active in the case of shifting processes where the drive motor would have stalled or the clutch would have been overloaded in the target gear at the low predefined initial speed and can be de-activated in all other cases.

In addition, the rotational speed of the motor also enables an initial estimation of the available power. If the drive motor, due to its low rotational speed, is capable of producing only a small amount of power, the standstill circuit 16 should be or should remain activated. On the other hand, if the motor power is sufficiently high to implement the desired shifting process without stalling the drive motor, the standstill circuit 16 can be de-activated. It is also worthwhile to provide various limit values, for use in various cases of gear changes; the limit values may be stored in a truth table or may be calculated with the help of additional influencing factors.

The rotational speed of the motor represents a good criterion for estimating the short-term available power of the drive motor. The power actually provided at any given time, however, depends not only on the rotational speed of the motor, but also on additional parameters. Whereas the acceleration of the motor rotational speed requires a considerable interval of time, relative to the time required for a shifting process, the level of the motor filling and/or the air-fuel mixture can change very quickly. Accordingly, the motor filling constitutes an important indicator as to whether the drive motor power, if necessary, can be increased quickly enough to satisfy the increased requirements following a shifting process. Accordingly, a further embodiment of the invention provides for the low-speed monitoring unit 18 to read data 20 concerning the motor filling and then to render the standstill circuit 16 ineffective when it recognizes that the motor filling has exceeded a fourth limit value.

An additional embodiment of the invention provides for the low-speed monitoring unit 18 to read data 20 concerning the motor torque, and then to render the standstill circuit 16 ineffective when it recognizes that the motor torque has exceeded a fifth limit value. Precisely because the rotational speed of the drive motor can change to only a limited extent over brief intervals of time and, when the gear is engaged and the clutch is engaged, represents a value which depends on the vehicle speed, the motor torque and the motor rotational speed may be used to derive conclusions with regard to the available power. Even the motor torque alone, however, enables an estimate which may be sufficient in many cases.

If several of the various types of data 20 are available, they may naturally be expediently combined. For example, the power of the drive motor may be approximately determined on the basis of its rotational speed and torque and read by the low-speed monitoring unit 18 for use as an expedient criterion. Instead of the torque, the extent of the motor filling may also be used for the purpose of estimation. The inclusion of additional motor data 20, such as ignition points or drive motor temperatures, can also be useful.

In this context, as set forth above, it is irrelevant whether the data 20 used are based on sensor values or default values or whether the low-speed monitoring unit 18 obtains them directly from the motor control device, retrieves them from other control devices or calculates or estimates them with the help of other data 20.

For example, if the vehicle has a sensor which determines the torque in the drive train, it is expedient for the low-speed monitoring unit 18, instead of the corresponding motor data 20, to read data 20 concerning the torque in the drive train, and then to render the standstill circuit 16 ineffective when it recognizes that the motor torque has exceeded a sixth limit value. In this way, external losses —such as those which may arise by adding one of the power train elements which can be driven by the drive motor—are automatically taken into account with no requirement for any further operations.

A last embodiment of the method provides for the low-speed monitoring unit 18 to read data 20 concerning the acceleration of the vehicle and then to render the standstill circuit 16 ineffective when it recognizes that the acceleration has exceeded a seventh limit value. At relatively high rates of acceleration, it may be assumed that the vehicle, even in the target gear, will be capable of increasing its speed even further. In addition, acceleration is a value which is especially easy to obtain; it is either present as such or can be easily calculated on the basis of the change in speed per unit of time.

Finally, the present document discloses a device suitable for the implementation of the method, the device being suitable for controlling a standstill circuit 16 of an automatic transmission 12 in which a decision unit 14 for selection of the target gear and the aforementioned standstill circuit 16 are present. This device is characterized by the additional provision of the low-speed monitoring unit, which can read data 20 concerning at least one state of the vehicle and, if necessary, additional data 20, as input values, and which is constructed in such a way that, on the basis of the input values and as a function of decision rules, it is capable of emitting an output signal which can render the standstill circuit 16 ineffective.

The more precise configuration and connection of the device depends on the components used, the data 20 structure, the spatial and other installation relationships and additional factors in individual cases. It is, however, frequently expedient for the low-speed monitoring unit 18 to constitute an integral part of a transmission control device because, in this way, the effort and expense involved in construction can be kept particularly low and the access to required data 20 —at least to those data 20 available from the automatic transmission 12 and the clutch—is especially simple to implement.

The invention can be explained in greater detail by way of one example of an embodiment. In this explanation, it is not possible to portray all expedient combinations of the various embodiments of the method or of the various data 20 which can be analyzed by the low-speed monitoring unit 18. Accordingly, for the sake of the example, a relatively simple embodiment of a method is described below.

A vehicle equipped with a low-speed monitoring unit 18 is traveling, fully loaded, on a 15% grade. At a speed of approximately 7 km/h (4.35 mph), the transmission control unit—more precisely, the decision unit 14—issues the command to shift from first gear into second gear. The shifting of the gears is initiated by disengaging the clutch, the second gear is engaged and the clutch is disengaged again. By this time, however, the speed of the vehicle has fallen to nearly zero.

In a conventional vehicle, the standstill circuit 16, at this point, would force a shift back into first gear. This, however, as a result of the repeated shifting process, would make the vehicle roll back down the slope, giving rise to a potentially dangerous situation.

The vehicle equipped according to the invention has a switching element on the dashboard, with which the driver can choose between two stable shifting positions in order to determine whether the low-speed monitoring unit 18 should basically be active. In addition, the switching element in the active position serves as a sensor which issues a signal to the low-speed monitoring unit 18, resulting in a forced de-activation of the standstill circuit 16 without considering any other parameters. In this example, the switch is in the active position.

The low-speed monitoring unit 18 is connected to a vehicle bus, such as a CAN bus, and can therefore have access to a plurality of different data 20. In addition to the actual vehicle speed, the acceleration determined from the course of the vehicle speed over time, the course of the acceleration and the intended or engaged target gear, the bus can also read certain motor data 20, on the basis whereof the low-speed monitoring unit 18 can calculate whether the short-term available power of the drive motor, at the rotational speed produced in the target gear with the clutch engaged, will suffice to accelerate the vehicle again on the slope. In addition, the motor temperature is taken into account so as not to place excessive strain on the drive motor if it is not yet warmed up. The device also determines whether the rotational speed of the drive motor is sufficiently high for the motor to run smoothly and/or how long the clutch has to operate in the slipping position in order to produce such a state.

These steps in the process, however, will preferably only be determined after several superordinate criteria have been fulfilled. Insofar as the low-speed monitoring unit 18 determines that the driver is exerting more than insignificant pressure on the brake, the system will assume that no further acceleration is desired and that a new startup process will be required. Accordingly, the standstill circuit 16 will not be de-activated and the first gear will be engaged.

However, if a reversal in the direction of rotation is recognized at the same time—that is, if the vehicle has changed its direction and is rolling down the slope —the low-speed monitoring unit 18 can render the standstill circuit 16 ineffective because, in such a case, it may be assumed that the driver is exerting pressure on the brake in order to prevent the vehicle from rolling back any further. In this case, it would be harmful to lose time by shifting down into first gear. Instead, the motor control and the clutch can be given a signal indicating that the effect of the brake should be supported by providing as high a motor torque as possible.

On the other hand, if the low-speed monitoring unit 18 recognizes that the driver only slightly deflects the gas pedal, the de-activation of the standstill circuit 16 by the low-speed monitoring unit 18 can be canceled because, in this case, the driver really does not desire any significant acceleration and, accordingly the speed, which can be achieved in the starting gear, is sufficient.

This example portrays only a few possibilities out of the many practical combinations of the embodiments of the method individually described above. Additional expedient combinations are readily evident to a person skilled in the art on the basis of the individual embodiments set forth above and/or, if necessary, through some sort of automated generation of a wide range of combinations and a selection of the combination most suitable at any given time. Accordingly, no additional inventive step is required; rather, it is primarily necessary to be familiar with the available data 20 and to estimate the respective effort, expense and benefit involved.

The invention claimed is:

1. A device configured to control an automatic transmission of a vehicle, the device comprising:
 a standstill circuit configured to one of prepare and activate a starting gear ratio when the vehicle is one of standing still or at a speed below a predetermined limit speed,
 a low-speed monitoring circuit configured to receive data representing at least one state of the vehicle in which the at least one state represented by the data is directly determined by a direct influence of a driver operating the vehicle, wherein
 the data represents:
  a deflection of a gas pedal,
  an operation of a vehicle brake, including at least one of:
   when one of the vehicle brake produces no braking effect and the braking effect is below a braking effect limit value,
  a driver input indicating one of a requirement for the standstill circuit and a deactivation of the standstill circuit,
  an operation of at least one of the transmission and a clutch, including at least one of:
   a shifting state of the transmission, and
   a disengaged state of the clutch,
  a direction of rotation of rotatable drive elements,
  at least one of the standstill of the vehicle and when a standstill of the vehicle is not recognized within a defined interval of time,
 an operation of at least one of a drive motor and a motor control device, including at least one of:
  when a rotational speed of the motor exceeds a motor rotational speed limit value,
  when a motor filling limit value is exceeded,
  when a motor torque exceeds a torque limit value, when a torque in a drive train exceeds a drive train torque limit value, and
an acceleration of the vehicle,
a decision unit implementing gear ratio selection rule and responsive to the standstill circuit and the low-speed monitoring circuit configured to select a target gear ratio for the automatic transmission, and
the low-speed monitoring unit emitting an output signal for rendering the standstill circuit one of ineffective and effective based on the data concerning at least one state of the vehicle and decision rules.

* * * * *